United States Patent
Onishi et al.

(10) Patent No.: US 7,940,433 B2
(45) Date of Patent: May 10, 2011

(54) IMAGE SENSOR

(75) Inventors: Hiroaki Onishi, Kyoto (JP); Hideki Sawada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 314 days.

(21) Appl. No.: 12/220,610

(22) Filed: Jul. 25, 2008

(65) Prior Publication Data

US 2009/0027739 A1    Jan. 29, 2009

(30) Foreign Application Priority Data

Jul. 27, 2007    (JP) ................. 2007-195780

(51) Int. Cl.
H04N 1/04    (2006.01)

(52) U.S. Cl. ........ 358/484; 358/475; 358/482; 358/483; 358/497

(58) Field of Classification Search .................. 358/484, 358/483, 482, 475, 497, 512–514, 509, 506, 358/487; 250/208.1, 239, 234–236; 362/632–634, 362/611–615, 551, 552; 399/219, 220, 221

See application file for complete search history.

(56) References Cited

U.S. PATENT DOCUMENTS

| 6,259,082 | B1 | 7/2001 | Fujimoto et al. |
| 6,455,834 | B2 * | 9/2002 | Fujimoto et al. ............ 250/208.1 |
| 2009/0034024 | A1 * | 2/2009 | Kim et al. ..................... 358/475 |
| 2009/0034030 | A1 * | 2/2009 | Nagatani et al. .............. 358/509 |

FOREIGN PATENT DOCUMENTS

JP    11-55464    2/1999

* cited by examiner

*Primary Examiner* — Cheukfan Lee
(74) *Attorney, Agent, or Firm* — Hamre, Schumann, Mueller & Larson, P.C.

(57) ABSTRACT

An image sensor includes an elongated case, a light source provided in the case, a light guiding member elongated in a longitudinal direction of the case and configured to direct light emitted from the light source toward a document to be read, an optical system for collecting light reflected by the document, a sensor IC chip for receiving the light collected by the optical system, and a substrate attached to the case. The substrate is provided with a wiring pattern and carries the sensor IC chip. The case is provided with a plurality of supporting projections spaced apart from each other in the longitudinal direction. The supporting projections are held in contact with the side surface of the light guiding member.

7 Claims, 3 Drawing Sheets

IMAGE SENSOR

BACKGROUND OF THE INVENTION

1. Field of the Invention

The present invention relates to an image sensor used for obtaining digital image data.

2. Description of the Related Art

Conventionally, linear light emitting units are often used in image reading devices such as contact-type or flatbed-type image scanners. As disclosed in JP-A-H11-55464, for example, a linear light emitting unit may comprise a light guiding member elongated in the primary scanning direction. This conventional light guiding member is configured to convert spot light (emitted from a spot light source) into linear light to irradiate a document to be read.

FIGS. 4-6 of the accompanying drawings of the present application illustrate a reference example for facilitating the understanding of the present invention. Specifically, as shown in FIG. 4, the illustrated image sensor 90 includes a resin case 91, a light guiding member 92, a lens array 93, a substrate 94 with a wiring pattern, and a sensor IC chip 95. The light guiding member 92 is formed with a reflection surface 921. The case 91 includes three supporting portions 911-913 for the light guiding member 92. FIG. 5 is a sectional view taken along lines V-V in FIG. 4, and FIG. 6 is a sectional view taken along lines VI-VI in FIG. 4. As shown in these figures, the image sensor 90 also includes a light source 96.

The image sensor 90 operates as follows. First, the light source 96 is turned on to emit light. The light is totally reflected at various portions of the surface of the light guiding member 92, while traveling in the light guiding member 92. Eventually, the light is reflected by the reflection surface 921, and emitted out of the light guiding member 92 to travel toward the document P. The light reflected by the document P is collected by the lens array 93 onto the sensor IC chip 95.

In the above reference example, a large area of the light guiding member 92 is held in contact with the case 91. As seen from FIGS. 5 and 6, each of the three supporting portions 911-913 in contact with the light guiding member 92 has substantially the same length as the light guiding member 92. With such an arrangement, the light striking on the portions where the light guiding member 92 contacts the nontransparent resin is partly absorbed by the nontransparent resin. Such light absorbance decreases the intensity of light supposed to irradiate the document P, thereby resulting in the deterioration in quality of image data outputted from the sensor IC chip 95.

SUMMARY OF THE INVENTION

It is therefore an object of the present invention to provide an image sensor suitable for obtaining high-quality images by irradiating documents with enough light.

According to the present invention, there is provided an image sensor comprising: an elongated case; a light source provided in the case; a light guiding member elongated in a longitudinal direction of the case and configured to direct light emitted from the light source toward a document to be read; an optical system for collecting light reflected by the document; a sensor IC chip for receiving the light collected by the optical system; and a substrate provided with a wiring pattern and attached to the case, with the sensor IC chip mounted on the substrate. The case is provided with a plurality of supporting portions spaced apart from each other in the longitudinal direction, and the plurality of supporting portions are held in contact with the light guiding member.

Preferably, each of the plurality of supporting portions may project to the light guiding member.

Preferably, the light guiding member may be provided with a reflection surface elongated in the longitudinal direction, where the reflection surface is disposed at a position out of interference with the plurality of supporting portions.

Preferably, each of the plurality of supporting portions, as viewed in the longitudinal direction, may have a length that is negligibly small relative to a length of the light guiding member.

Preferably, the plurality of supporting portions may include first, second and third supporting portions disposed in a triangular arrangement as viewed in section of the light guiding member.

Other features and advantages of the present invention will become apparent from the detailed description given below with reference to the accompanying drawings.

DETAILED DESCRIPTION OF THE PREFERRED EMBODIMENTS

Figure 1:
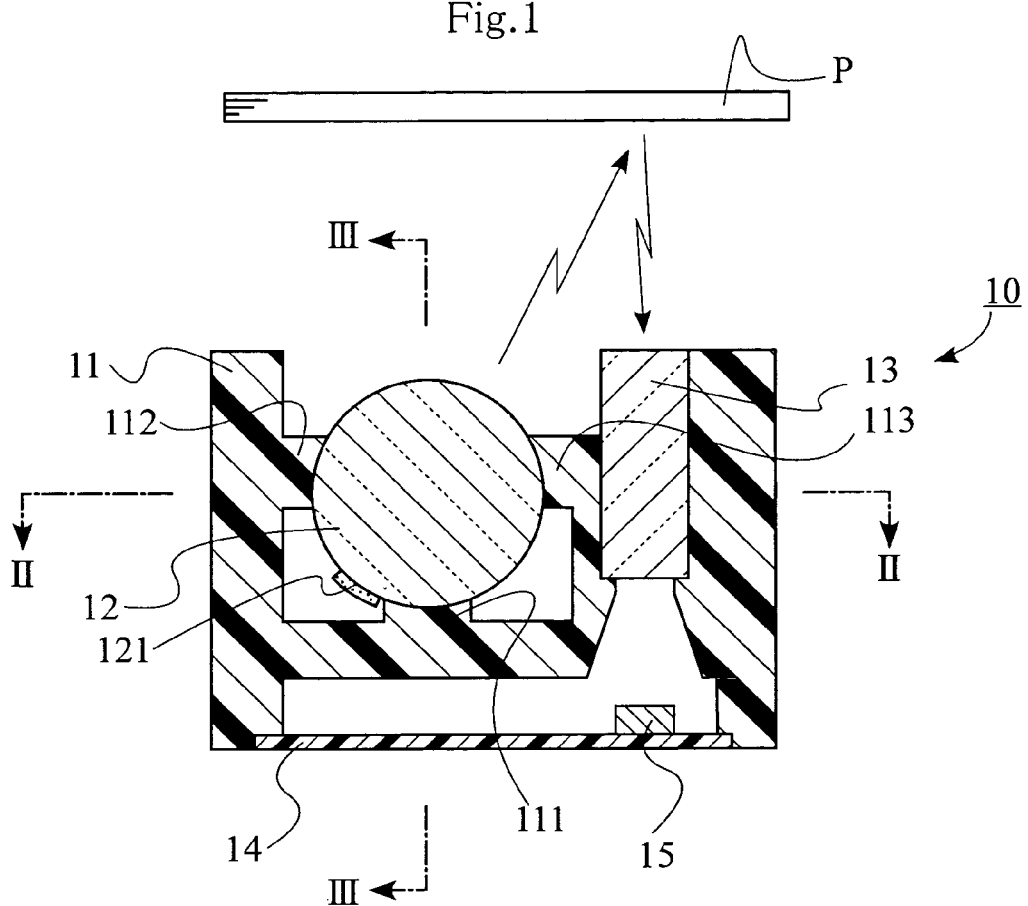
FIG. 1 is a sectional view illustrating an image sensor according to the present invention.
Figure 2:
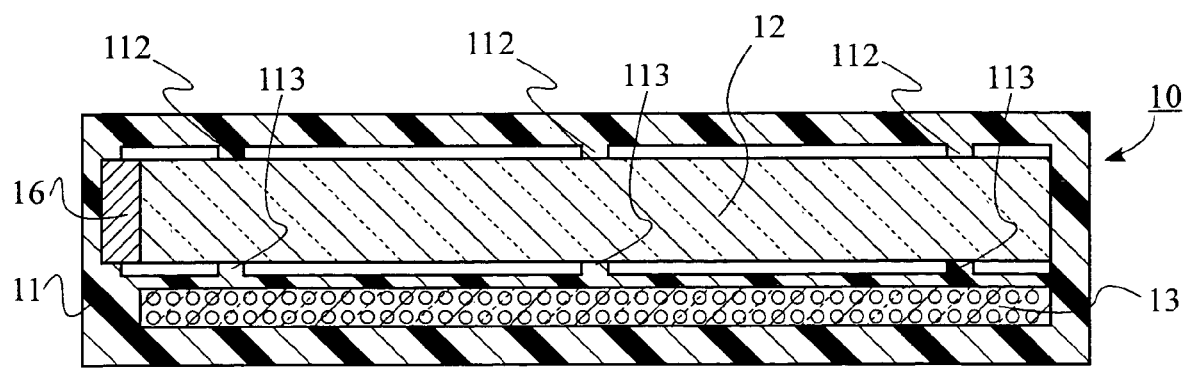
FIG. 2 is a sectional view taken along lines II-II in FIG. 1.
Figure 3:
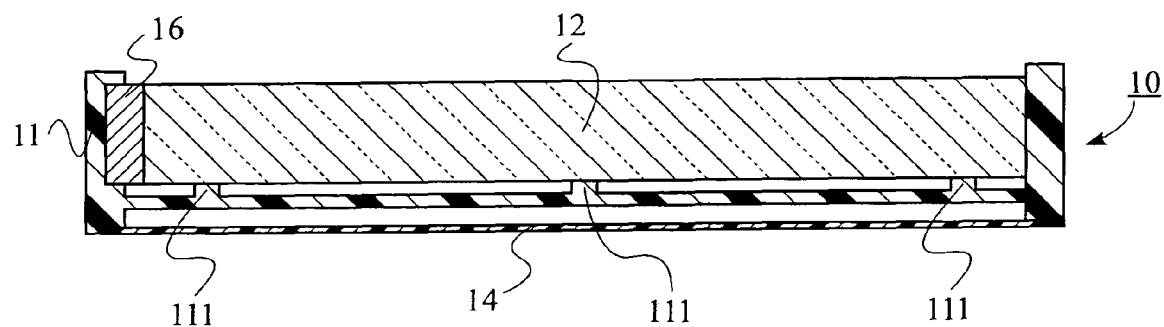
FIG. 3 is a sectional view taken along lines III-III in FIG. 1.
Figure 4:
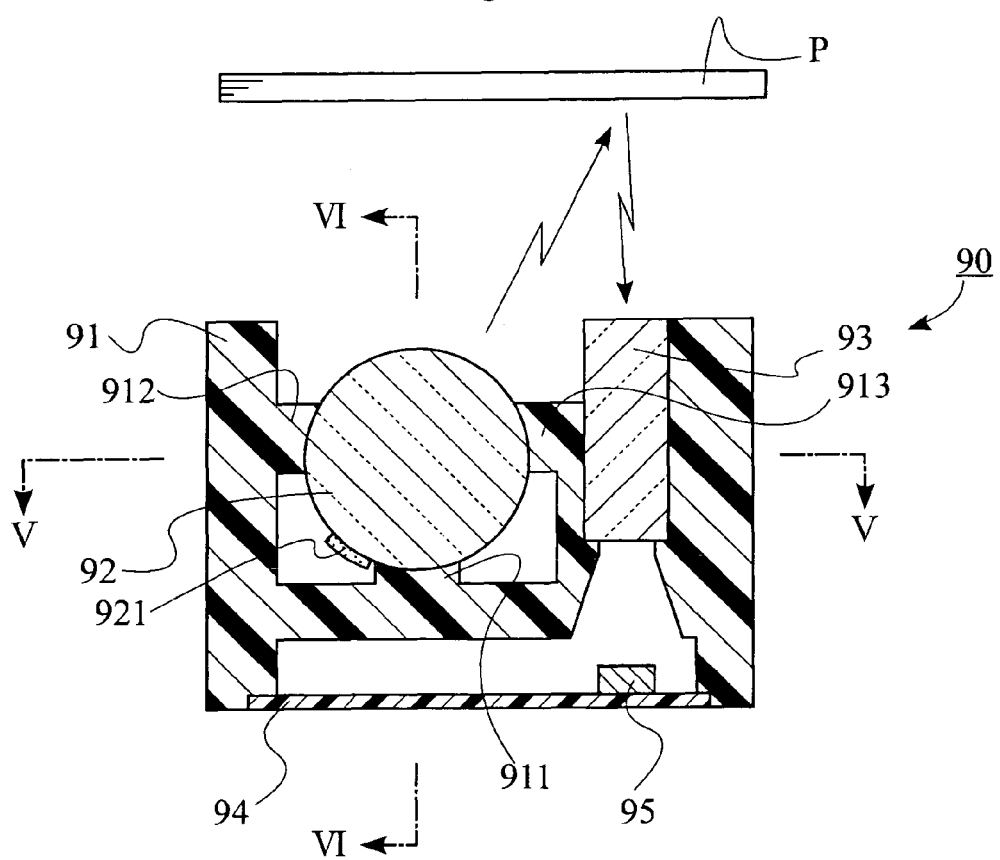
FIG. 4 is a sectional view illustrating an image sensor as a reference example for facilitating the understanding of the present invention.
Figure 5:
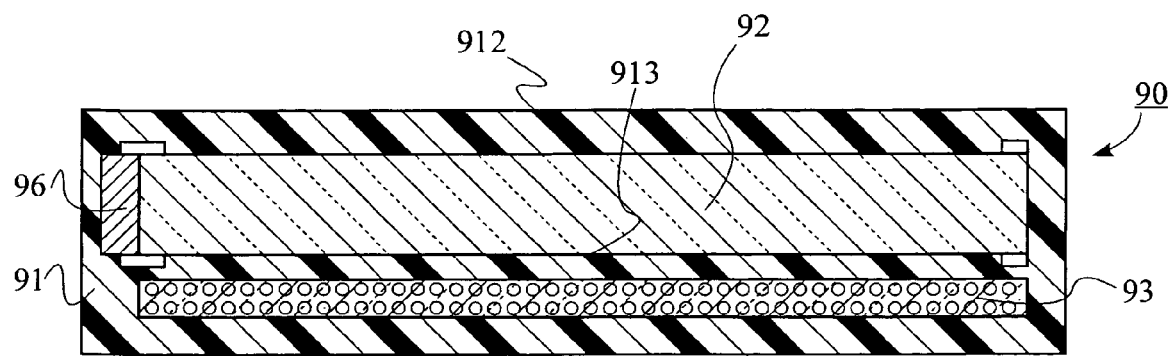
FIG. 5 is a sectional view taken along lines V-V in FIG. 4.
Figure 6:
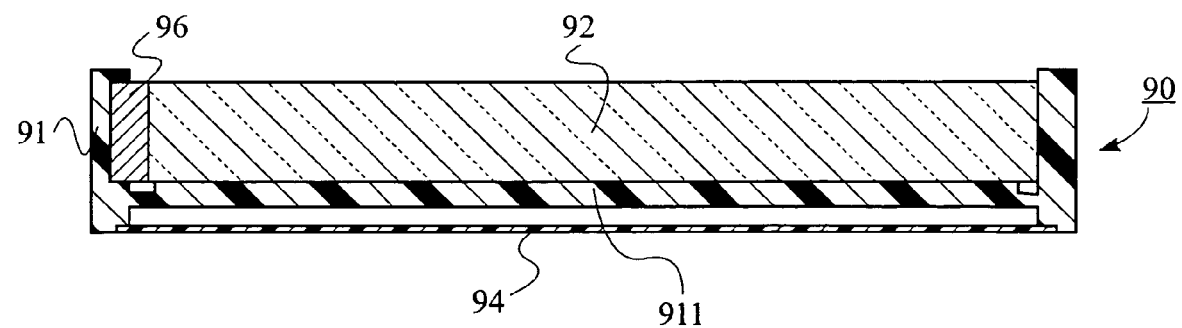
FIG. 6 is a sectional view taken along lines VI-VI in FIG. 4.

FIGS. 1-3 illustrate an image sensor according to the present invention.

As shown in FIG. 1, the image sensor 10 of the present invention includes a case 11 made of a nontransparent resin, a light guiding member 12 made of a transparent resin, a lens array 13, a substrate 14 provided with a predetermined wiring pattern, and a sensor IC chip 15. In addition, as shown in FIGS. 2 and 3, the image sensor 10 includes a point light source 16 disposed at one end of the light guiding member 12. Referring back to FIG. 1, the light guiding member 12, elongated in the primary scanning direction (which is perpendicular to the surface of FIG. 1), includes a reflection surface 121 elongated in the longitudinal direction of the light guiding member 12. For reflecting light in a predetermined direction or directions, the reflection surface 121 is provided with irregularities or covered with white coating, for example.

FIG. 2 is a sectional view taken along lines II in FIG. 1, while FIG. 3 is a sectional view taken along lines III-III in FIG. 1. As seen from FIGS. 2 and 3, the case 11 is provided with a plurality of first supporting projections 111, a plurality of second supporting projections 112, and a plurality of third supporting projections 113. These supporting projections 111-113 are made of the same resin material as the remaining portions of the case 11, to be integral with them. The light guiding member 12 is supported only by the first, second and third supporting projections 111-113 each having a small contact area held in direct contact with the surface of the light guiding member 12.

The first supporting projections 111 are spaced apart from each other in the longitudinal direction of the light guiding member 12. Preferably, the length of each of the first supporting projections 111 is rendered as small as possible relative to the length of the light guiding member 12, without compromising the proper supporting function for the light guiding member 12. In this specification, this condition is described as "the length of each supporting projection is negligibly small relative to that of the light guiding member." With such an arrangement, only a very small area of the surface of the light guiding member 12 contacts the first supporting projections 111, while most of the surface area of the light guide member 12 is exposed to the air (out of contact with the supporting projections 111). The second supporting projections 112 and the third supporting projections 113 have a similar structure to that of the first supporting projections 111.

As shown in FIG. 1, the first supporting projections 111 are located at a lower position than and between the second and the third supporting projections 112, 113, to support the light guiding member 12 from below. On the other hand, the second and the third supporting projections 112, 113 are located at the same height above the first supporting projections 111, to flank the light guiding member 12. With such a triangular arrangement as viewed in section of the image sensor 10 (and hence the light guiding member 12), the first, second and third supporting projections 111, 112, 113 can fix the light guiding member 12 at the predetermined position in the case 11 without relying on additional fixing means. The supporting projections 111, 112 and 113 are provided at positions that are out of interference with the reflection surface 121 mentioned above. In the illustrated example, as seen from FIG. 1, the reflection surface 121 is disposed between the first supporting projections 111 and the second supporting projections 112 as viewed circumferentially of the light guiding member 12.

The image sensor 10 operates as follows. First, the light source 16 emits light. The light is totally reflected at various portions of the surface of the light guiding member 12, while traveling through the light guiding member 12. Thereafter, the light is reflected by the reflection surface 121 for diffusion in the longitudinal direction of the light guiding member 12, and is emitted out of the light guiding member 12. Then, the light travels toward a document P. The light reflected by the document P is collected by the lens array 13 onto the sensor IC chip 15. Accordingly, one line of digital image data is outputted by a circuit mounted on the wiring substrate 14.

When the light is reflected at a portion where the light guiding member 12 contacts one of the supporting projections 111-113 made of nontransparent resin, the light is partly absorbed by the resin. However, since the most part of the light guiding member 12 is out of contact with the supporting projections 111-113 (that is, exposed to the air), the light is less likely to be wasted by absorption. Accordingly, the light emitted from the light source 16 is efficiently used for irradiation of the document P, and hence the image sensor 10 can produce high-quality images.

The invention claimed is:

1. An image sensor comprising:
    an elongated case;
    a light source provided in the case;
    a light guiding member elongated in a longitudinal direction of the case and configured to direct light emitted from the light source toward a document to be read;
    an optical system for collecting light reflected by the document;
    a sensor IC chip for receiving the light collected by the optical system; and
    a substrate provided with a wiring pattern and attached to the case, the substrate carrying the sensor IC chip,
    wherein the case is provided with a plurality of supporting portions spaced apart from each other in the longitudinal direction, the plurality of supporting portions being held in contact with the light guiding member, and
    wherein each of the plurality of supporting portions projects to the light guiding member.

2. The image sensor according to claim 1, wherein the light guiding member is provided with a reflection surface elongated in the longitudinal direction, the reflection surface being disposed at a position out of interference with the plurality of supporting portions.

3. The image sensor according to claim 1, wherein each of the plurality of supporting portions, as viewed in the longitudinal direction, has a length that is negligibly small relative to a length of the light guiding member.

4. The image sensor according to claim 1, wherein the plurality of supporting portions include first, second and third supporting portions disposed in a triangular arrangement as viewed in section of the light guiding member.

5. An image sensor comprising;
    an elongated case;
    a light source provided in the case;
    a light guiding member elongated in a longitudinal direction of the case and configured to direct light emitted from the light source toward a document to be read;
    an optical system for collecting light reflected by the document;
    a sensor IC chip for receiving the light collected by the optical system; and
    a substrate provided with a wiring pattern and attached to the case, the substrate carrying the sensor IC chip,
    wherein the case is provided with a plurality of supporting portions spaced apart from each other in the longitudinal direction, the plurality of supporting portions being held in contact with the light guiding member, and
    wherein the plurality of supporting portions include first, second and third supporting portions disposed in a triangular arrangement as viewed in section of the light guiding member.

6. The image sensor according to claim 5, wherein the light guiding member is provided with a reflection surface elongated in the longitudinal direction, the reflection surface being disposed at a position out of interference with the plurality of supporting portions.

7. The image sensor according to claim 5, wherein each of the plurality of supporting portions, as viewed in the longitudinal direction, has a length that is negligibly small relative to a length of the light guiding member.

* * * * *